United States Patent [19]

Bacchi

[11] Patent Number: 4,755,941

[45] Date of Patent: Jul. 5, 1988

[54] SYSTEM FOR MONITORING THE MOVEMENT OF MONEY AND CHIPS ON A GAMING TABLE

[76] Inventor: Lorenzo Bacchi, 1 Link Way, Denham, Buckinghamshire UB9 5NL, United Kingdom

[21] Appl. No.: 904,553

[22] Filed: Sep. 5, 1986

[30] Foreign Application Priority Data

Sep. 6, 1985 [GB] United Kingdom ................. 8522163

[51] Int. Cl.[4] ................................................ G06F 15/28

[52] U.S. Cl. ................................ 364/412; 273/138 A

[58] Field of Search ......................... 364/412, 410–411; 273/138 A

[56] References Cited

U.S. PATENT DOCUMENTS 4,303,248 12/1981 Shoemaker .......................... 273/356
4,531,187 7/1985 Uhland ................................ 364/412
4,643,425 2/1987 Herzenberger ................. 273/142 B

*Primary Examiner*—Jerry Smith

*Assistant Examiner*—Gail O. Hayes

*Attorney, Agent, or Firm*—Klein & Szekeres

[57] ABSTRACT

A monitoring system is arranged to monitor and record each transaction taking place on a gaming table. The system includes a tray for receiving gaming chips and sensors for sensing the chips held by the tray. A cash box is provided for the deposite of cash received in return for chips dispensed from the tray. A keyboard is provided to record each deposit of cash into the cash box. A central processing unit is responsive to a timer, the keyboard and the sensors to record each transaction which takes place on the gaming table into data storage means. A warning light lights up in the event that money which has been deposited in the cash box is not entered into the keyboard. The system enables management to conduct a complete analysis of the transactions taking place on the gaming table, to provide not only figures giving the profitability of the table but also an indication of the competance and integrity of the croupier.

10 Claims, 2 Drawing Sheets

SYSTEM FOR MONITORING THE MOVEMENT OF MONEY AND CHIPS ON A GAMING TABLE

BACKGROUND OF THE INVENTION

1. Field of the Invention

The present invention relates to monitoring systems for example for monitoring cash/chip transactions at a gaming table of a casino.

The profitability of a gaming table in a casino is subject to a widely varying number of factors such as location, the personality of the croupier and a host of other variables.

There is often quite a delay before it is discovered that the profitability of a table is below an acceptable level and even more time and effort have to be expended in ascertaining the reasons for its unprofitability before corrective action can be taken.

2. Description of the Prior Art

An in depth study of a particular table usually involves the presence of a manager who must spend many hours observing the table and analysing the movement of money and chips across the table.

It is an object of the invention to provide a system which monitors the movement of money and chips across the gaming table and provides an analysis of the movement as a guide to management.

The system also acts to deter dishonesty in gaming personnel and so strengthens the security arrangement of the establishment.

SUMMARY OF THE INVENTION

According to the present invention there is provided a system for monitoring the movement of money and chips on a gaming table or in a gaming environment, the system comprising a chip receptacle for holding chips, means for providing an instantaneous count of chips in a chip receptacle, keyboard means into which amounts of money received from players in return for chips can be keyed in, data storage means, and means responsive to a trigger to feed data corresponding to the instantaneous count of chips, and data corresponding to the keyed in amounts of money, into the data storage means.

Advantageously warning means is provided to warn when money received from players is not keyed-in.

Preferably further warning means is provided to give a warning when any change occurs in the chips stored in the chip receptacle and to provide said trigger for storing the instantaneous count of said chips into the data storage means.

Each said transaction stored by the storage means can be accompanied by an indication of the time of the transaction as delivered from a timer.

Advantageously the system includes a portable master control unit which is operable to interrogate said data storage means to extract from the data storage means one or more selected items of data.

DESCRIPTION OF THE DRAWINGS

A cash/chip transacted monitoring system embodying the invention will now be described by way of example with reference to the accompanying diagrammatic drawing, in which:

As shown in FIG. 1 the monitoring system is installed in a black-jack table 2 inside a casino.

DESCRIPTION OF THE PREFERRED EMBODIMENT

Figure 1:
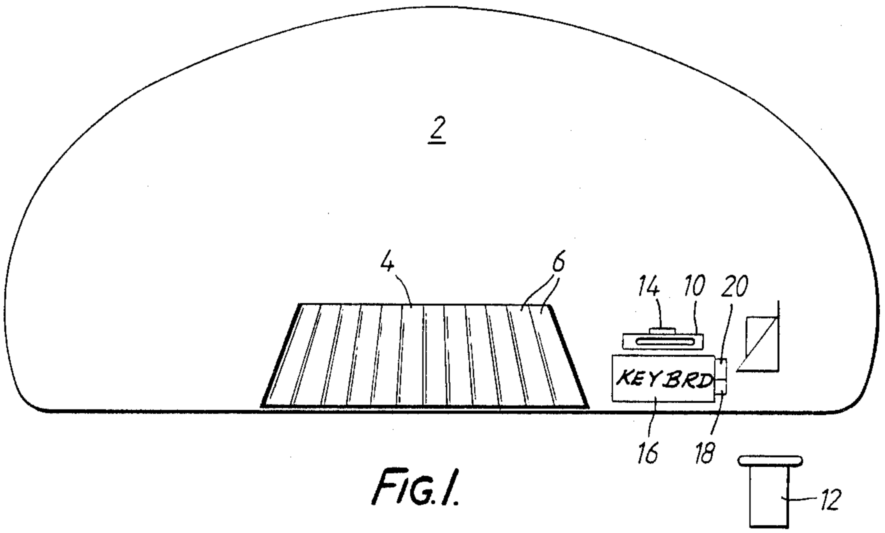
FIG. 1 is a plan view of a gaming table incorporating the system.

While the system shown is installed in a black-jack table, it will be appreciated that it can be installed with obvious modification in any other type of gaming table where movement of money/chips needs to be monitored and analysed.

Mounted on the table 2 is a chip receptacle or holder tray 4 defining a plurality of elongate recesses 6 each of semi-circular cross-section. Each recess 6 is arranged to slope with respect to the horizontal and is arranged to hold and store a row of chips of a particular colour (denomination) and quantity; each recess 6 holding chips of a different colour (denomination) and quantity. The table 2 has the usual aperture 10 leading to a strong box (not shown) and a pusher member 12 for pushing currency notes through the aperture 10 into the strong box. A microswitch or infrared detector 14 is mounted on the wall of the aperture 10 and is triggered each time the pusher 12 is inserted into the aperture 10.

A keyboard 16 is located adjacent the aperture 10. The keyboard 16 carries a plurality of keys each designating a different denomination of note. For example, the keys may be denominated as 1, 5, 10, 20, 50 and 100. If the croupier receives $17.00, he would press the 1 key twice, the 5 key once and the 10 key once. The keys are selected to designate each denomination of note in the currency of the country of the casino. Adjacent the keyboard is a warning light 18.

Thus as the croupier receives a certain number of bank notes he keys the appropriate amounts into the keyboard 16 and then inserts the notes into the aperture 10 with the aid of the pusher 12. The action of the pusher 12 on the switch 14 will cause the information regarding the keyed-in notes to be stored. If the croupier inserts the notes into the aperture 10 with the pusher 12 without keying their value into the keyboard, a warning light 18 located on the side of the keyboard will flash and the system will need resetting.

A portable master control unit 22 is arranged to be carried by a member of the management team. The control unit 22 has a transmitter and receiver 30 which can communicate with a transmitter and receiver 20 located on the table 2. The transmission may take place by way of infra red, unltrasonic or radio waves.

The control unit 22 includes a keyboard 24 for keying in commands and, a display unit 26 on which information can be displayed. The control unit can be connected to a separately located printer 28 for providing a print-out of data received from the transmitter and receiver 20.

Figure 2:
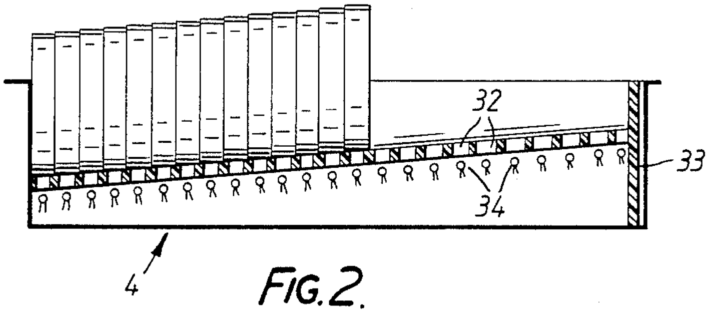
FIG. 2 is a section through a chip holder tray.
Figure 4:
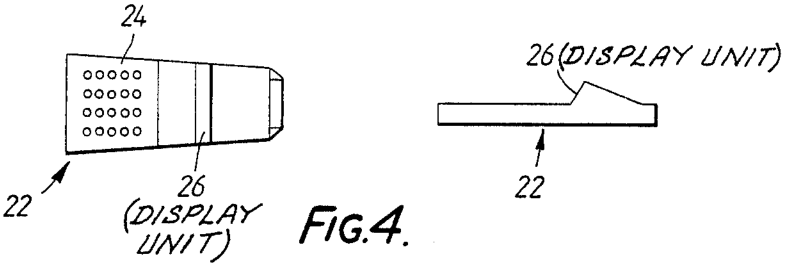
FIG. 4 is a plan and side elevation of a master control unit of the system.

As shown in more detail in FIG. 2 each elongate recess 6 in the chip holder tray 4 is provided with a longitudinally extending row of holes or openings 32 in the base thereof. The centres of the openings 32 are separated by a distance corresponding to the width of one chip. The openings 32 are so located that each chip put into the recess will cover a corresponding one of the openings 32. Thus if the recess 6 houses six chips, six holes 32 will be covered by the chips. Located below each hole 32 is a photocell 34 to detect the presence or absence of a chip above a corresponding hole 32. The arrangement is such that at any instant, and from the signals provided by the photocells 34, the total number of chips of each denomination or value can be ascertained. In a modification instead of using photocells 34, a distance measuring device (not shown) may be mounted on the end wall 33 and directed towards the chips. By determining the distance from the last chip in the column (and knowing the thickness of each chip) the number of chips in each column can be determined. This information is constantly fed to a central processing unit 40 which will hereinafter be described in more detail.

Figure 3:
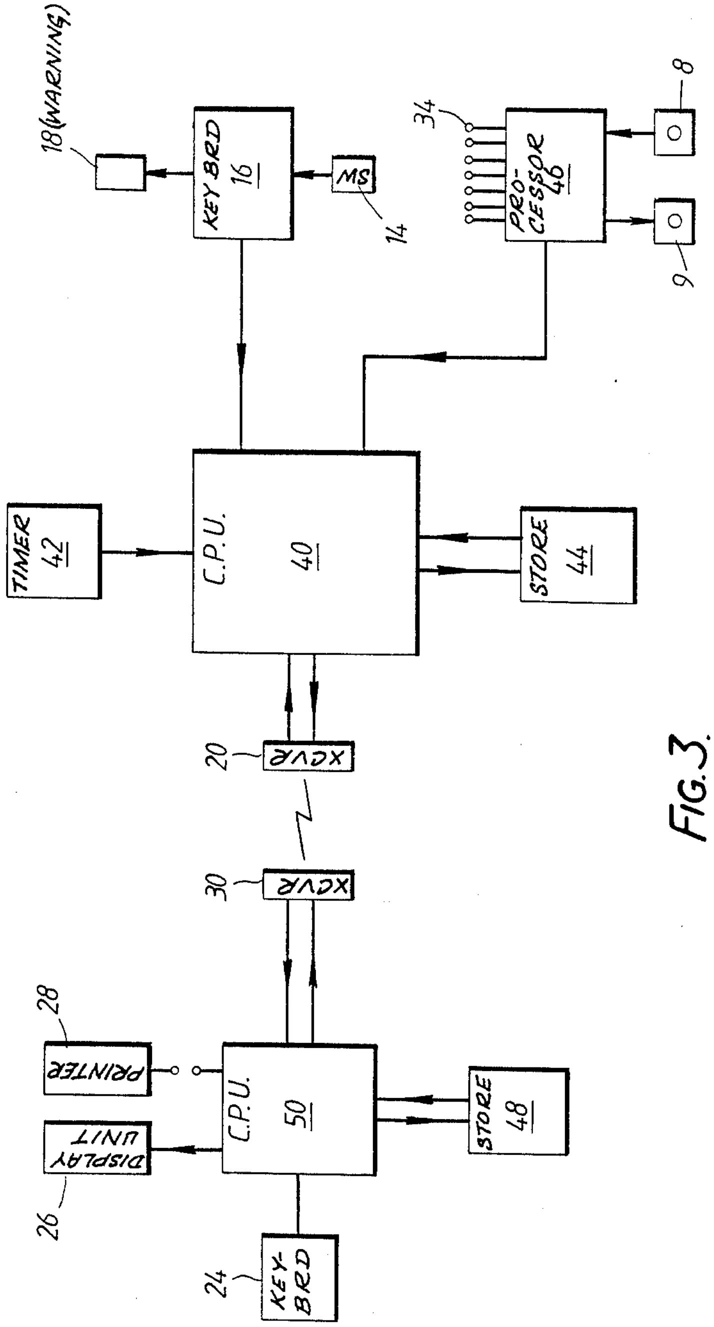
FIG. 3 is a block diagram of the system.

FIG. 3 shows a block diagram of the system. The system includes a central processing unit 40, a timer 42 connected to the central processing unit 40 and a store 44 also connected to the central processing unit (CPU) 40. A processor 46 receives signals from the photocells 34 and provides signal representative of the chips present in the tray 4. The processor 46 also detects any change in the number of chips. The key signals from the keyboard 16 will also be transmitted to the CPU 40 each time the switch 14 is triggered.

The CPU 40 is also connected to the transmitter and receiver 20 to enable an exchange of data to take place.

The master control unit 22 also includes a central processing unit (CPU) 50 and store 48 for storing data. The CPU 50 is coupled to the keyboard, the printer 28, the display unit 26, and to the transmitter receiver 30.

In operation each time the switch 14 is tripped, data representing the amount of money inserted into the aperture 10 is fed to the CPU 40 which logs the data along with a time signal from the timer 42 into the store 44. Each time such a log is made the data of earlier logs is read out again by the CPU 40 and a total and a percentage is evaluated and stored in the store 44. The total value stored is updated with each new entry so that at any time the total money in the strong box (not shown) can be read out.

At the end of each play on the gaming table the croupier must pay out winnings from the tray and replenish the tray with the chips lost by the losers. As soon as the croupier disturbs the numbers of chips in the tray as sensed by the processer 46, the CPU 40 acts to store this data along with a time signal from the timer 42 in the store 44.

As with the signals from the keyboard 16 the CPU 40 keeps a running total of the chips in the tray and stores this total in the store.

Thus the store stores each movement of chips and money on the table along with the time that the movement took place, together with a running total of the chips held in the tray 4 and the money held in the strong box (not shown).

To extract the information from the store 44 a manager is provided with a portable master control unit 22. A code is keyed into the keyboard 24 of the unit identifying the table in question and this code is transmitted by the transmitter 30 to the receiver 20 to actuate the CPU 40. Once actuated the CPU 40 will respond giving its identity and await further instructions. The manager may then selectively actuate a key to select the running total of money in the strong box. The CPU 40 will respond to extract this information from the store and it will be transmitted by the transmitter 20 to the receiver 30 for display on the display unit 26. Instead the total chip count may be selected and displayed in the same way.

The manager by actuating another key on the keyboard can cause the CPU 40 to download the entire contents of the store 44 into the store 48 from where the data can be printed at a later time by the printer 28.

Preferably for security reasons the master control unit 22 may need a security code keyed into the keyboard 24 by the manager before the unit 22 can be used further.

In a modification the control unit 22 may be linked permanently to each gaming table by direct lines and further means provided to display a running total of all money and chips from all tables to alert management at an early stage to any significant loss which may be brought about by a team of gamblers making a concerted effort to defraud the casino.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. In a gaming table or gaming environment system for monitoring the movement of money and chips on the gaming table or in the gaming environment, the system comprising;

a chip receptacle for holding chips;

means mounted on the receptacle for sensing the chips therein and providing an instantaneous count of the chips held in the chip receptacle;

keyboard means into which amounts of money received from players in return for chips can be keyed in;

data storage means;

means coupling the chip sensing means and the keyboard means to the data storage means; and control means responsive to a trigger to cause the chip sensing means and the keyboard means respectively to feed data corresponding to the instantaneous count of chips and data corresponding to the keyed in amounts of money, into the data storage means.

2. A system according to claim 1 including a cash receptacle into which cash received from players is deposited;

detection means mounted on the cash receptacle to provide an output each time cash is deposited in the cash receptacle; and warning means connected to the keyboard means and the detection means operable to provide a warning when money is deposited in the cash receptacle and is not keyed-into the keyboard means.

3. A system according to claim 2 including second warning means connected to monitor the chip sensing means and operable to give a warning when any change occurs in the chips stored in the chip receptacle and to provide said trigger for causing the instantaneous count of said chips to be fed into the data storage means.

4. A system according to claim 1 including;

timing means, and means connecting the timing means to the control means for causing each said transaction stored by the data storage means to be accompanied by an indication of the time of the transaction as delivered from a timer.

5. A system according to claim 1 including a portable master control unit, the master control unit including;

means for coupling the unit to the data storage means; and means operable to interrogate said data storage means to extract from the data storage means one or more selected items of data.

6. In a gaming table having a cash receptacle and a chip receptacle, a monitoring system for monitoring the transactions on the gaming table, the system comprising;

sensing means coupled to the chip receptacle for sensing the chips in the chip receptacle and operable at any instant to provide an output signal indicative of the instantaneous cash value of the chips held in the cash receptacle, input means mounted on the table and operable to supply data indicative of the monetary value of the cash which on each occasion is deposited in the cash receptacle;

memory means;

a timer providing a signal indicative of time; and a central processing unit, connected to the sensing means, the input means, and timer, to cause the time and details of each transaction on the table to be logged in the memory means.

7. A system according to claim 6, including;

a master control unit;

transmitting and receiving means coupling said master control unit to the central processing unit, said master control unit having controls operable to cause the data in said memory means to be transferred to said master control unit for evaluation.

8. A system according to claim 6 wherein said memory means has a predetermined storage location, and wherein said central processing unit is responsive to the input means to store the value of the deposited cash in said predetermined location in said memory means and upon each cash transaction is operable to update the value stored in said predetermined location so that it always represents the total cash deposited in said cash store.

9. A system according to claim 8 wherein said memory means has a second predetermined location and wherein said central processing unit includes summing means responsive to the sensing means and the cash value stored in said predetermined location, to sum the monetary value of the chips in the receptacle and the cash deposited in the cash receptable and to store the result in the second predetermined location in said memory means.

10. A gaming table monitoring system comprising;

a receptacle for storing chips;

sensing means coupled to the receptacle for sensing the total monetary value of chips stored in the receptacle;

a cash box for storing cash;

a keyboard for registering the cash deposited in the cash box;

detection means for detecting when on each occasion cash is deposited in the cash box;

warning means coupled to the detection means and the keyboard for providing a warning when cash deposited in the cash box is not registered on the keyboard;

a timer;

memory means;

a central processing unit;

means coupling the sensing means the keyboard and the timer to the central processing unit, the central processing unit being operative each time a change in the chips stored in the receptacle occurs and each time the keyboard is operated, to store the nature and time of transaction, as given by the timer, in the memory means; and reading means coupled to the memory means through the central processing unit for reading the data from the memory means and supplying it in a suitable form for analysis.

* * * * *